United States Patent [19]

Reinke

[11] 4,197,053
[45] Apr. 8, 1980

[54] AIR DRIVEN PROPELLER

[76] Inventor: Elmer E. Reinke, R.R. 1, Davenport, Nebr. 68335

[21] Appl. No.: 902,089

[22] Filed: May 2, 1978

[51] Int. Cl.² .............................................. F03D 1/06
[52] U.S. Cl. ................................ 416/91; 416/231 R; 416/93 R; 416/207
[58] Field of Search ............... 416/20, 91, 197 A, 207, 416/93 R, 231 R

[56] References Cited

U.S. PATENT DOCUMENTS

| 1,300,552 | 4/1919 | Barr | 416/91 |
| 1,770,328 | 7/1930 | Titterington | 416/197 A X |
| 2,007,506 | 7/1935 | Smith | 416/91 |
| 4,110,631 | 8/1978 | Salter | 416/121 X |

FOREIGN PATENT DOCUMENTS

| 154152 | 5/1952 | Australia | 416/20 |
| 550281 | 12/1957 | Canada | 416/20 |
| 592393 | 8/1925 | France | 416/91 |
| 905544 | 12/1945 | France | 416/91 |
| 564687 | 7/1975 | Switzerland | 416/197 A |
| 250679 | 4/1926 | United Kingdom | 416/91 |

Primary Examiner—Everette A. Powell, Jr.
Attorney, Agent, or Firm—Clarence A. O'Brien; Harvey B. Jacobson

[57] ABSTRACT

A hub is provided defining an axis of intended rotation to be disposed generally parallel to the direction of wind movement and the hub is hollow and include opposite ends spaced along the aforementioned axis. One end of the hub is closed and the other end is open to receive therein the wind incident upon the hub. The hub includes a plurality of elongated hollow propeller blades supported therefrom including root and tip ends as well as leading and trailing edges. The blades have their root ends supported from the hub at points spaced thereabout with the root ends opening into the interior of the hub inwardly of the open end thereof and the tip ends of the blades extending outwardly from the hub. The trailing edges of the blades include air outlets slots extending and spaced therealong opening outwardly of the blades in directions generally opposite to the directions in which the leading edges of the blades face and the blades are supported from the hub for adjustable angular displacement about their longitudinal axes relative to the hub.

3 Claims, 8 Drawing Figures

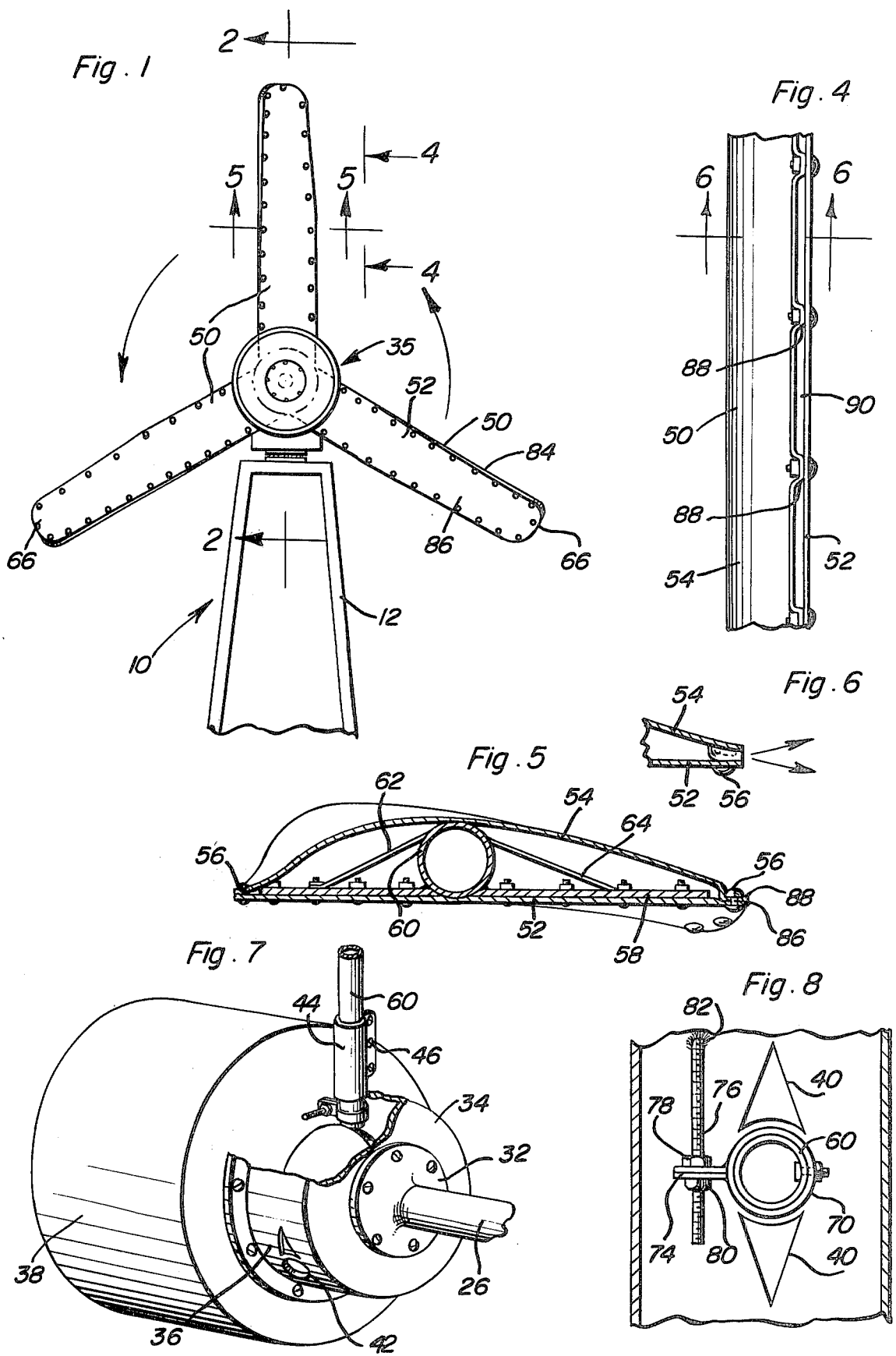

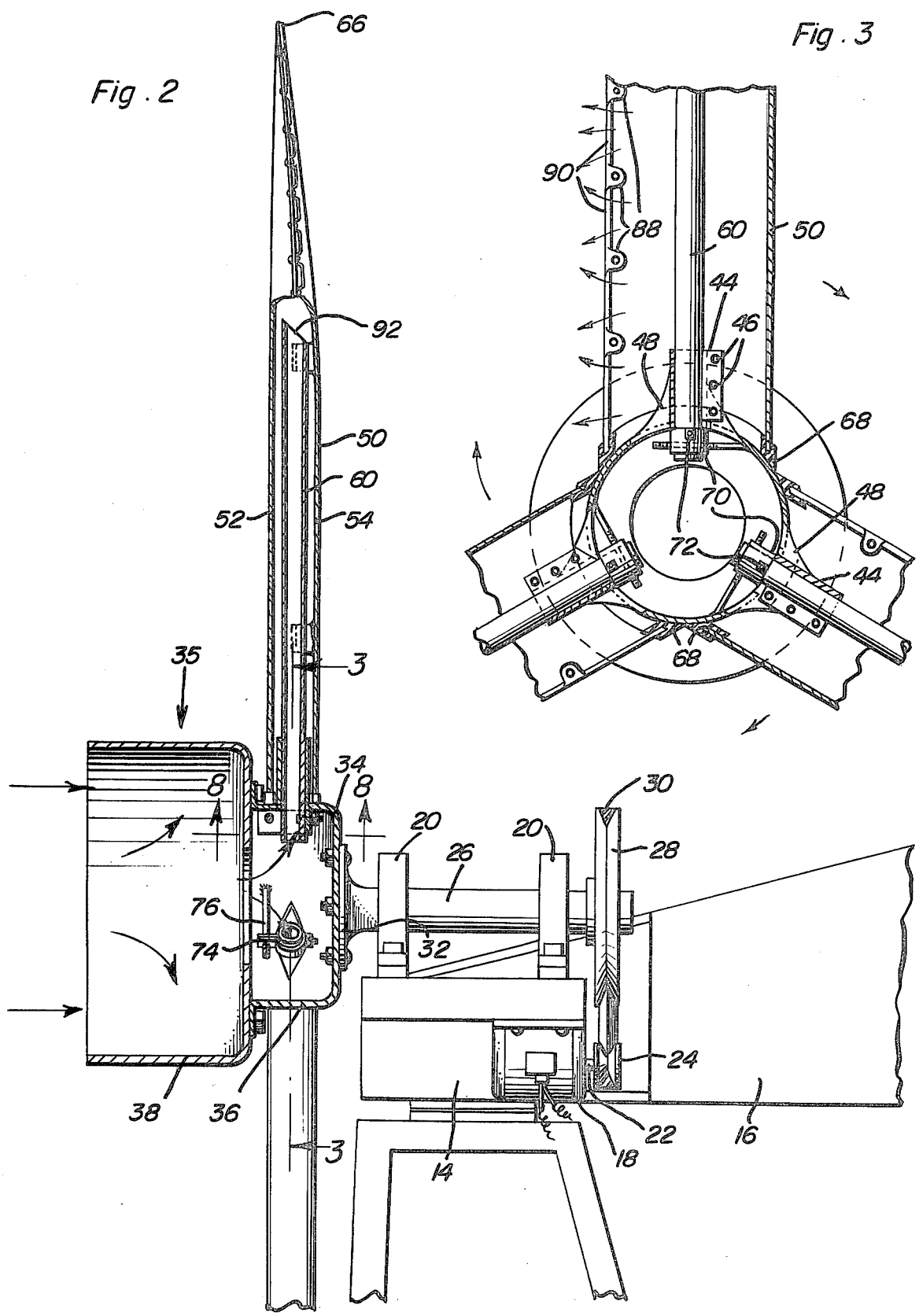

AIR DRIVEN PROPELLER

BACKGROUND OF THE INVENTION

Various forms of windmills have been heretofore provided. Many windmills are constructed in the general form of propeller assemblies and such windmills are reasonably efficient in more than minimal winds, but their efficiency falls off greatly when they are subject to only minimal winds.

Some forms of propeller-type windmills have been constructed including improvement characteristics whereby their efficiency in minimal winds is increased. Such improvement characteristics include hollow hub portions and hollow blade portions opening into the hub portions and with blade tip air outlets opening in directions opposite to the directions in which the leading edges of the blades face. Accordingly, wind entering the hollow hub portion passes therefrom into the blades, along the latter and out of the tip of the blades. While this improvement characteristic does in fact enable propeller-type windmills to perform with greater efficiency in minimal winds, there still exists a need for improvement of efficiency for propeller-type windmills when operating in minimal winds.

Windmills including some of the general structural and operational features of the instant invention are disclosed in U.S. Pat. Nos. 1,300,552, 1,666,517, 1,667,506, 1,862,846, 1,923,054 and 2,007,506.

BRIEF DESCRIPTION OF THE INVENTION

The propeller-type windmill of the instant invention includes a hollow hub which opens forwardly into the wind and hollow blades which radiate outwardly from the hub and have their interiors communicated with the interior of the hub. However, rather than providing the tip ends of the hollow blade with air outlets, the trailing edges of the blades are provided with elongated slots spaced and extending longitudinally along the trailing edges. In this manner, a greater exhaust of air entering the hub of the windmill is afforded from the hollow blades of the windmill and the exhaust of air from the trailing edges of the blades greatly increases the efficiency of the windmill in minimal winds.

The main object of this invention is to provide a propeller-type windmill whose efficiency in minimal winds will be greatly increased.

Yet another object of this invention is to provide a propeller-type windmill which may be utilized to generate increased rotational torque.

Still another object of this invention is to provide a propeller-type windmill whose blades may be angularly adjusted about their longitudinal axes relative to the supporting hub portion of the windmill.

A further important object of this invention is to provide a propeller-type windmill which may be readily fabricated.

A final object of this invention to be specifically enumerated herein is provide a propeller-type windmill in accordance with the preceding objects and which will conform to conventional forms of manufacture, be of simple construction and dependable in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, front elevational view of a windmill constructed in accordance with the present invention;

FIG. 2 is an enlarged, fragmentary, vertical sectional view taken substantially upon the plane indicated by the section line 2—2 of FIG. 1;

FIG. 3 is a fragmentary, vertical sectional view taken substantially upon the plane indicated by the section line 3—3 of FIG. 2;

FIG. 4 is an enlarged, fragmentary, elevational view taken substantially upon the plane indicated by the section line 4—4 of FIG. 1;

FIG. 5 is a fragmentary enlarged sectional view taken substantially upon the plane indicated by the section line 5—5 of FIG. 1;

FIG. 6 is a fragmentary sectional view taken substantially upon the plane indicated by the section line 6—6 of FIG. 4;

FIG. 7 is a fragmentary, perspective view of the hub portion of the windmill with portions thereof being broken away and with one of the propeller blade supporting structures fragmentarily illustrated in operative position relative to the hub; and FIG. 8 is a fragmentary sectional view taken substantially upon the plane indicated by the section line 8—8 of FIG. 2.

DETAILED DESCRIPTION OF THE INVENTION

Referring now more specifically to the drawings, the numeral 10 generally designates a windmill constructed in accordance with the present invention. The windmill 10 includes a standard 12 from whose upper portion a mount 14 is rotatably supported for rotation about a vertical axis. The mount 14 includes a rearwardly projecting wind vane 16, a generator 18 and a pair of journals 20 supported therefrom. The generator 18 includes a rotary input shaft 22 upon which a pulley 24 is mounted and a support shaft 26 is journaled from the journals 20 and has a pulley 28 mounted thereon aligned with the pulley 24. An endless belt 30 is trained about the pulleys 24 and 28 and drivingly connects the pulley 28 to the pulley 24 of the generator 18.

The forward end of the support shaft 26 includes an enlarged mounting flange 32 upon which the hub 34 of a propeller assembly 35 is mounted. The hub 34 includes a small diameter rear end portion 36 opening forward into the rear of a large diameter forward end portion 38 and the forward end portion 38 is open at its forward end and defines a forwardly facing air inlet.

The rear portion 36 of the hub has three circumferentially spaced pairs of oppositely directed and circumferentially spaced generally triangular openings 40 formed therein and a cylindrical opening 42 is formed between each pair of adjacent openings 40.

Split support sleeves 44 including clamping screws 46 are supported from the hub portions disposed about the cylindrical openings 42 and are braced relative to the adjacent hub portions by means of pairs of webs 48 bisecting the corresponding openings 40.

A plurality of elongated blades 50 are provided and include first and second opposite side panels 52 and 54 extending longitudinally therealong. The panels 52 are generally planar, except for being slightly twisted toward the free ends of the blades 50 and the panels 54 are transversely arcuate and have their opposite longitudinal edge portions secured to the corresponding edge portions of the panels 52 by means of spaced rivets 56. However, the panels 52 are interiorly braced by means of bracing panels 58 overlying and secured to the inner surfaces of the panels 52 and each of the blades 50 includes a center longitudinally extending tubular shank 60 extending longitudinally thereof between the panels 52 and 54 and braced relative to the bracing panel 58 by means of pairs of oppositely inclined braces 62 and 64 spaced along the tubular shanks 60 and secured between the latter and the corresponding bracing plates 58 in any convenient manner such as by welding. The tubular shanks 60 terminate a spaced distance inwardly of the outer tip ends 66 of the blades 50, but project outwardly of the root ends of the blades 50, the root ends of the blades 50 being contoured so as to conform to outer surfaces of the opposing partial cylindrical portions of the hub 38 and the contoured root ends of the blades 50 are provided with seal structures 68 disposed between the outer surfaces of the hub and the adjacent end edges of the panels 52 and 54 of the blades 50.

The ends of the tubular shanks 60 remote from the tip ends 66 of the blades 50 are telescoped through the split support sleeves 44 and tightened therein by tightening the clamp screws 46 and those portions of the tubular shanks 60 which project inwardly of the split support sleeves 44 have stop sleeves 70 telescoped thereover and releasably secured in position thereon by means of fasteners 72. Further, the sleeves 70 include outstanding apertured ears 74 through which one pair of corresponding ends of threaded adjustment shanks 76 are received and the adjustment shanks 76 have pairs of threaded nuts 78 and 80 threadedly engaged thereon on opposite sides of the corresponding apertured ears 74. The other set of corresponding ends of the threaded shanks 76 are secured, as by welding 82, to adjacent inner surfaces of the hub 34. Accordingly, when the clamp screws 46 of the split clamp sleeves 44 are loosened, the nuts 78 and 80 may be adjusted in order to adjustably angularly displace the blades 50 about the longitudinal center axes of the tubular shanks 60 thereof.

The blades 50 define leading edges 84 and trailing edges 86 and the longitudinal edges of the panels 54 extending along the trailing edges 86 include offset portions 88 spaced longitudinally therealong displaced toward the corresponding panels 52 and through which the rivets 56 are secured. Accordingly, elongated air outlet slots 90 are defined between the offset portions 88 extending and spaced along the trailing edge 86 of each blade 50 substantially the full length thereof.

The outer ends of the tubular shanks 60 are open as at 92, see FIG. 2, and thus the tubular shanks 60 open into the interiors of the blades 50 spaced inwardly of the tip ends 66 thereof and the openings 40 open into the interiors of the blades 50 at the root ends thereof.

In operation, wind incident upon the front of the assembly 35 strikes the blades 50 and thus tends to rotate the assembly 35. However, if the wind velocity is not sufficient to start rotation of the assembly 35, the wind entering the open front portion 38 of the hub 34 passes into the rear portion 36 of the hub 34 and then into the adjacent ends of the tubular shanks 60 as well as through the openings 40 into the interiors of the blades 50. The air passing from within the hub 34 into the interiors of the blades 50 is discharged from the trailing edges of the blades 50 through the slot 90 and thus is effective to start rotation of the assembly 35. Accordingly, the assembly is rendered efficient in even light winds. Of course, rotation of the asembly 35 causes the generator 18 to be driven through the belt 30 and thus electrical power to be generated. The wind vane 16 maintains the mount 14 in position with the open forward end of the forward portion 38 of the hub 34 facing into the wind.

Inasmuch as most localities experience low wind velocities a major portion of the time, the windmill of the instant invention is considerably more effective and is capable of generating electrical current over longer periods of time than conventional windmills. Further, while some propeller-type windmills include hollow blades including only blade tip air outlets, the provision of blade tip air outlets only tends to offer too much restriction to the free discharge of air from the blade tips, whereby the pressures within the hollow blades deveoped by light winds are not sufficiently above the ambient pressure at the blade tips to effect sufficient air velocity from the blade tips to enable these forms of propeller-type windmills to be driven by light winds.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An air driven propeller assembly for converting relative wind forces into rotary torque, said assembly including a hub defining an axis of intended rotation to be disposed generally parallel the direction of wind movement, said hub being hollow and including opposite ends spaced along said axis, one rear end of said hub being closed and the other front end being open to receive therein a portion of the wind incident upon said assembly, said hub including a plurality of elongated hollow propeller blades supported therefrom including root and tip ends as well as leading and trailing edges, support means removably supporting the root ends of said blades from said hub at points spaced thereabout for angular displacement of said blades about their longitudinal axes relative to said hub and with said root ends opening into the interior of said hub inwardly of said open end and the tip ends of said blades extending outwardly from said hub, said trailing edges including air outlet means defining air outlets spaced therealong opening outwardly of said blades in directions generally opposite to the directions in which said leading edges face, said outlet means defining the air outlets spaced along a major portion of the length of each blade, each of said blades including an internal elongated longitudinally extending tubular shank, the inner ends of said tubular shanks corresponding to said root ends also opening into said rear closed end of said hub and the remote outer ends of said shanks opening into the interiors of the outer end portions of said blades whereby the pressure of ram air entering the open end of said hub may be maintained more evenly throughout the length of the interior of each of said blades, said hub including circumferentially spaced generally radially extending support sleeves, said support means including said support sleeves and the inner ends of said tubular shanks, said tubular shanks being captively received through said sleeves and angularly displaceable relative thereto, said support means further including means operatively connected between said hub and said shanks for adjustably angularly displacing the latter relative to said sleeve.

2. The combination of claim 1 wherein air outlets include elongated outlet slots spaced and extending along said trailing edges.

3. The combination of claim 1 wherein said open front end of said hub is enlarged and extends radially outwardly of said axis of intended rotation further than the root end portions of said blades and the closed rear end portion of said hub is diametrically reduced relative to said open end, said root ends of said blades opening into the rear end of said hub.

* * * * *